(12) United States Patent
Choo et al.

(10) Patent No.: US 11,378,558 B2
(45) Date of Patent: Jul. 5, 2022

(54) METHODS, APPARATUS, AND COMPUTER-READABLE MEDIA FOR GLYCOPEPTIDE IDENTIFICATION

(71) Applicant: AGENCY FOR SCIENCE, TECHNOLOGY AND RESEARCH, Singapore (SG)

(72) Inventors: Sern Farh Matthew Choo, Singapore (SG); Terry Nguyen-Khuong, Singapore (SG); Pauline Mary Rudd, Singapore (SG)

(73) Assignee: AGENCY FOR SCIENCE, TECHNOLOGY AND RESEARCH, Singapore (SG)

( * ) Notice: Subject to any disclaimer, the term of this patent is extended or adjusted under 35 U.S.C. 154(b) by 214 days.

(21) Appl. No.: 16/772,828

(22) PCT Filed: Feb. 21, 2019

(86) PCT No.: PCT/SG2019/050098
§ 371 (c)(1),
(2) Date: Jun. 15, 2020

(87) PCT Pub. No.: WO2019/168468
PCT Pub. Date: Sep. 6, 2019

(65) Prior Publication Data
US 2021/0164947 A1 Jun. 3, 2021

(30) Foreign Application Priority Data
Feb. 27, 2018 (SG) .......................... 10201801598Q

(51) Int. Cl.
*G01N 30/72* (2006.01)
*G01N 30/86* (2006.01)
*G01N 30/88* (2006.01)

(52) U.S. Cl.
CPC ..... *G01N 30/7233* (2013.01); *G01N 30/8675* (2013.01); *G01N 30/88* (2013.01); *G01N 2030/8831* (2013.01)

(58) Field of Classification Search
CPC ...... G01J 1/44; G01J 2001/446; H01J 37/244; H01J 37/28; H01J 43/08; H01J 43/28; H01J 2237/2443
See application file for complete search history.

(56) References Cited

U.S. PATENT DOCUMENTS 7,378,492 B2 * 5/2008 Chawla ................ C07K 14/705
435/69.7
8,569,445 B2 * 10/2013 Yue .................... G01N 33/5023
530/300

(Continued)

OTHER PUBLICATIONS

Noro et al., "Large-Scale Identification of N-Glycan Glycoproteins Carrying Lexis X and Site-Specific N-Glycan Alterations in Fut9 Knockout Mice", J. Proteome Res., vol. 14, No. 9, Aug. 21, 2015, pp. 3823-3834.

(Continued)

*Primary Examiner* — David A Vanore
(74) *Attorney, Agent, or Firm* — Marshall, Gerstein & Borun LLP

(57) ABSTRACT

A method identifies glycopeptides in a sample. The method includes converting a mass spectrum of MS1 precursors of the sample into a plurality of nodes in a graph, each node corresponding to one mass and one retention time of a glycopeptide to be identified in the sample; calculating differences in the mass and/or retention time between all combinations of pairs of the nodes; generating a graph theoretic network of the nodes; and predicting compositions of the glycopeptides in the sample based on the graph theoretic network of the nodes so as to identify the glycopeptides.

25 Claims, 12 Drawing Sheets

(56) References Cited

U.S. PATENT DOCUMENTS 8,639,447 B2 1/2014 Kim et al.
2011/0010099 A1* 1/2011 Adourian .............. G16B 5/00
702/19

OTHER PUBLICATIONS

Togayachi et al., "Identification of Poly-N-Acetyllactosamine-Carrying Glycoproteins From HL-60 Human Promyelocytic Leukemia Cells Using a Site-Specific Glycome Analysis Method, Glyco-RIDGE", J. Am. Soc. Mass Spectrom., vol. 29, No. 6, Apr. 19, 2018, pp. 1138-1152.
Huang et al., "Identification of Protein OP-glycosylation Site and Corresponding Glycans Using Liquid Chromatography-tandem Mass Spectrometry Via Mapping Accurate Mass and Retention Time Shift", Journal of Chromatography A, vol. 1371, Nov. 1, 2014, pp. 136-145.
Narimatsu et al., "Current Technologies for Complex Glycoproteomics and Their Applications to Biology/Disease-Driven Glycoproteomics", Journal of Proteome Research, vol. 17, No. 12, Oct. 25, 2018, pp. 4097-4112.
Goldberg et al., "Automated N-Glycopeptide Identification Using a Combination of Single- and Tandem-MS", Journal of Proteome Research, vol. 6, No. 10, Aug. 30, 2007, pp. 3995-4005.
Search Report and Written Opinion in International Application No. PCT/SG2019/050098 dated May 13, 2019, 10 pages.

* cited by examiner

METHODS, APPARATUS, AND COMPUTER-READABLE MEDIA FOR GLYCOPEPTIDE IDENTIFICATION

TECHNICAL FIELD

The present invention relates to the field of glycopeptide identification. In particular, it relates to methods, apparatuses, and computer-readable media for glycopeptide identification using graph theoretic analysis of liquid chromatography mass spectrometry (LCMS) data.

BACKGROUND ART

Current approaches to glycopeptide identification focus on interpreting glycopeptide LCMS data based on proteomic analysis. These approaches generally involve database-driven MS/MS fragment searches which rely upon combining databases of theoretical peptides generated from the genome and theoretical glycans to produce a database of theoretical glycopeptides with their theoretical MS/MS fragments. To restrict the size of the otherwise computationally unrealistic database, a common approach to studying a single glycoprotein is to first restrict the glycan list by characterizing the released N-glycome in a glycomics experiment. Glycopeptides in the LCMS data are identified by matching detected precursor (i.e. MS1 precursor) and MS/MS fragment ions (i.e. MS2 fragment ions) to the above-mentioned theoretical database, and then statistically scored for confidence.

Based on the theoretical databases, some database-dependent algorithms and software are available to identify N-glycopeptides, such as Byonic (Protein Metrics), Proteome Discoverer (Thermo), GlycoPeptideSearch, GlycoPepEvaluator, MAGIC and pGlyco. These programs perform well enough when there is sufficient prior knowledge of the glycoprotein and its glycosylation. However, an inherent limitation of these database-dependent approaches is that they cannot identify unexpected glycopeptides that are not in the user-supplied database, even if the glycopeptide is visually obvious to the expert researcher in the raw data. In addition, database-dependent software do not show (1) which peaks are unidentified, (2) unidentified spectra with strong likelihood to be glycopeptides, (3) when a spectrum matches the database well but would have matched an extra-database sequence better, (4) an estimate for completeness of annotation that would warn the investigator when the search parameters were suboptimal, and (5) a visual representation of dense LCMS data that enables exploration. The above current approaches create the problem of "not knowing what you do not know" because the total set of glycopeptides is unknown, and also restrict proteomic solutions from increasing the number of found peptides and reducing false detection rates.

Thus, there is a need for methods that solve that above mentioned shortcomings and further provide other related advantages.

SUMMARY OF THE INVENTION

Example embodiments include methods and apparatus for glycopeptide identification.

One example embodiment is a method for identifying glycopeptides in a sample. The method comprises converting a mass spectrum of MS1 precursors of the sample into a plurality of nodes in a graph, each node corresponding to one mass and one retention time of a glycopeptide to be identified in the sample; calculating differences in the mass and/or retention time between all combinations of pairs of the nodes; generating a graph theoretic network of the nodes; and predicting compositions of the glycopeptides in the sample based on the graph theoretic network of the nodes so as to identify the glycopeptides.

One example embodiment is an apparatus for identifying glycopeptides in a sample. The apparatus comprises at least one input module; at least one output module; at least one processor; and at least one memory including computer program code. The input module is configured to receive data from a liquid chromatography-mass spectrometry (LC-MS) system, the data including mass spectrum data. The output module is configured to output a result of the identified glycopeptides. The at least one memory and the computer program code are configured to, with the at least one processor, cause the apparatus at least to: convert a mass spectrum of MS1 precursors of the sample into a plurality of nodes in a graph, each node corresponding to one mass and one retention time of a glycopeptide to be identified in the sample; calculate differences in the mass and/or retention time between all combinations of pairs of the nodes; generate a graph theoretic network of the nodes; and predict compositions of the glycopeptides in the sample based on the graph theoretic network of the nodes so as to identify the glycopeptides.

BRIEF DESCRIPTION OF THE DRAWINGS

The accompanying figures, where like reference numerals refer to identical or functionally similar elements throughout the separate views and which together with the detailed description below are incorporated in and form part of the specification, serve to illustrate various embodiments and to explain various principles and advantages in accordance with example embodiments.

Figure 1:
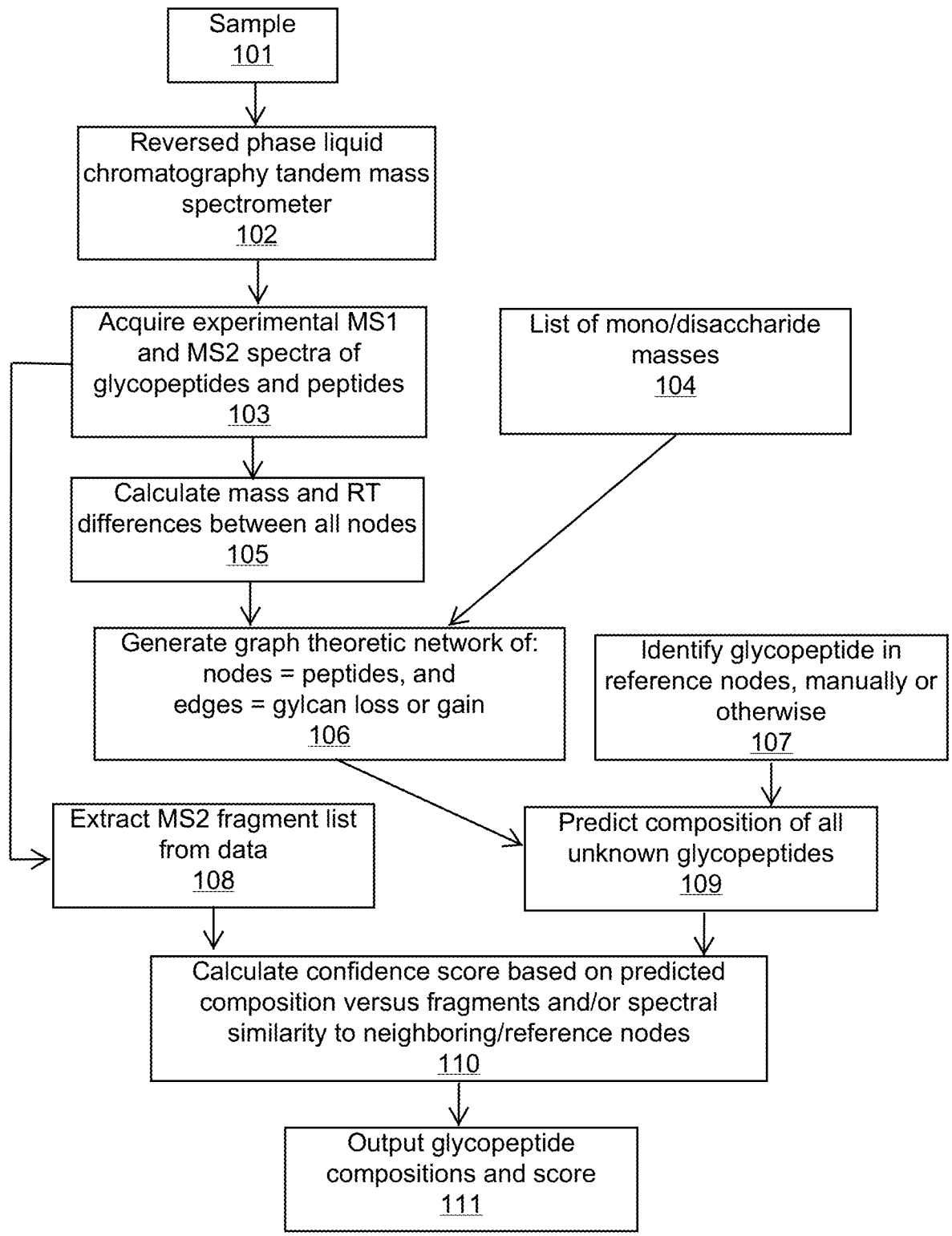
FIG. 1 is a method for glycopeptide identification in a sample in accordance with an example embodiment.

Skilled artisans will appreciate that elements in the figures are illustrated for simplicity and clarity and have not necessarily been depicted to scale.

DETAILED DESCRIPTION

The following detailed description is merely exemplary in nature and is not intended to limit example embodiments or their uses. Furthermore, there is no intention to be bound by any theory presented in the preceding background or the following detailed description. It is the intent of the present embodiments to present unique methods and apparatus for glycopeptide identification.

As noted, database-dependent approaches that identify glycopeptides have inherent limitations in that they generally (1) fail to identify the glycopeptide when MS/MS spectrum quality is uninformative or absent, (2) do not detect unexpected glycopeptides outside the database even if present at high abundance and (3) may incorrectly assign glycopeptide sequences because certain combinations of glycans have the same mass as amino acids.

Example embodiments solve these problems and include methods and apparatus that execute automated glycopeptide identification using graph theoretic analysis of liquid chromatography mass spectrometry data. These example embodiments include a glycopeptide identification method and apparatus that identify compositions of unknown glycopeptides (as well as known glycopeptides) by analysing MS1 features using graph theory in a sample.

To address these problems in glycoproteomics, an example embodiment (GlycopeptideGraphMS) uses a graph theoretical bioinformatic approach complementary to the database-dependent method. In the example embodiment, LCMS features are grouped into graph networks based on glycan mass and retention time (RT) differences. In doing so, the identification of a feature as a glycopeptide is validated by its distance to neighboring glycopeptide features.

One example embodiment executes a method on the tryptic glycopeptides of cancer-associated AXL receptor tyrosine kinase (AXL) glycoprotein. AXL was chosen because it has multiple N-glycan sites, is a druggable target that has been linked to chemoresistance in triple negative breast cancer, and its N-glycosylation has not been characterized. GlycopeptideGraphMS identified more glycopeptides than the database-dependent method and was shown to overcome some limitations of database-dependent approaches by extending glycopeptide identifications to even peaks lacking MS/MS fragmentation, identifying glycopeptides with glycan compositions outside the released N-glycome, and detecting mistaken identifications caused by an unexpected protease cleavage between Ala-Glu by their incongruous position within a graph network. Within a discrete graph network, only a single correctly assigned MS/MS was needed to identify the rest of the peptide glycoforms by exploiting sequential patterns in glycopeptide precursors, at low false discovery rate (FDR). GlycopeptideGraphMS combined with a database-approach reduces the reliance on high-quality MS/MS and could potentially bring the field closer to the ultimate goal of comprehensive automated glycoproteomics.

FIG. 1 is a method for glycopeptide identification in a sample in accordance with an example embodiment.

Analysis of a sample (101) occurs with an apparatus or methodology, such as a reverse phase liquid chromatography tandem mass spectrometer (102).

Liquid chromatography-mass spectrometry (LC-MS) is a technique that combines liquid chromatography (LC) and mass spectrometry (MS). In this technique, liquid chromatography separates mixtures with multiple components, and mass spectrometry provides structural identities of these individual components. This tandem technique of LC-MS can be used to analyze a variety of biochemical, organic, and inorganic compounds found in samples having environmental and/or biological origin. Further, example embodiments can be applied in a wide range of applications, such as biotechnology, environmental monitoring, food processing, and industries relating to pharmaceuticals and drug development, agrochemicals, and cosmetics.

Block 103 acquires experimental MS1 and MS2 spectra of glycopeptides and peptides. The MS1 and MS2 mass spectra are acquired from the mass spectrometer by the mass spectrometry vendor's control software in the form of electronic media. The ion signals detected in MS1 and MS2 mass spectra are converted into lists of mass, retention time and intensity by feature finding and deconvolution.

Block 104 provides a list of mono/disaccharide masses. This list consists of rows of entries, where each entry contains for example the following: the name of the mono/disaccharide or oligosaccharide; its accurate residual mass in Daltons; a RT window in a unit of time; a list of its composition, such as number of each monosaccharide and number of modifications; and optionally an indication of color for the purpose of visualisation.

Block 105 calculates mass and RT differences between all nodes. MS1 features are converted into nodes, and each node has one mass and one retention time (RT). Mass and RT differences are calculated between the nodes.

The method identifies clusters of nodes that have mass differences corresponding to an addition or subtraction of monosaccharide differences or combinations thereof. These differences are based on a list of user-defined mono/disaccharide masses with respective identities and allowable retention time. Each cluster represents a family of glycopeptides that share the same peptide backbone. For instance, the method retains only pairs of nodes that have differences equal to glycan differences and that are within certain retention times as provided in the list. The method groups (i.e. "networks") these retained nodes because the mass of glycan gains/losses is predictable.

Block 106 generates a graph theoretic network of nodes that equal peptides and edges that equal glycan loss or gain. The method executes graph theory to illustrate the grouped/networked retained nodes as different subgraphs. Each subgraph represents glycopeptides made of the same peptide backbone with different glycan attached. It is noted that nodes that are illustrated with increased neighbors in the subgraphs are more likely to be correctly identified.

Generating a graph theoretic network of nodes includes retaining only pairs of nodes that have differences equal to glycan differences and within certain retention time. This information is provided in a list of user-defined mono/disaccharide masses with respective identities and allowable retention time. Further, the example embodiment groups and/or networks the retained nodes because the mass of glycan gains and/or losses is predictable based on the list.

Block 107 identifies glycopeptide in reference nodes, manually or otherwise (e.g., automatically). One glycopeptide per subgraph is set as a reference node for that subgraph and is then separately identified using either manual sequencing from peptide fragment ions in the MS2 spectrum or by using the result from the output of a database-dependent search.

Block 108 extracts an MS2 fragment list from the data. Optionally, any available MS2 spectra are used to generate through peak picking and/or centroiding and/or deconvolution a list of MS2 ions. This list is optionally used to determine if the nodes in a subgraph have similar fragments as a way of improving the confidence in the grouping of the subgraph.

Block 109 predicts compositions of all unknown glycopeptides. The method predicts the composition of unknown glycopeptides (nodes) in each subgroup based on the composition of known glycopeptides (nodes that tally with reference glycopeptides) that are neighboring the unknown glycopeptides (nodes).

The predicted composition of unknown glycopeptides in the MS1 data can be subsequently used together with conventionally analyzed MS2 data to output glycopeptide identifications of the sample.

Block 110 calculates a confidence score based on predicted composition versus fragments and/or spectral similarity to neighbor and/or reference nodes. The score is a result of a mathematical function that converts multiple aspects of the graphs such as delta RT distribution, delta mass distribution, similarity of MS2 fragments, number and quality of nodes in the subgraph, and number and quality of edges into a single score value that indicates the confidence of the assignment. The mathematical function may consist of a single or multiple equations, or a set of machine learning features, weights or scores, or a statistical calculation.

Block 111 outputs glycopeptide compositions and/or scores. For example, the results are displayed on a computer, further processed, printed, transmitted to another computer or electronic device, and/or saved in memory.

Figure 2A:
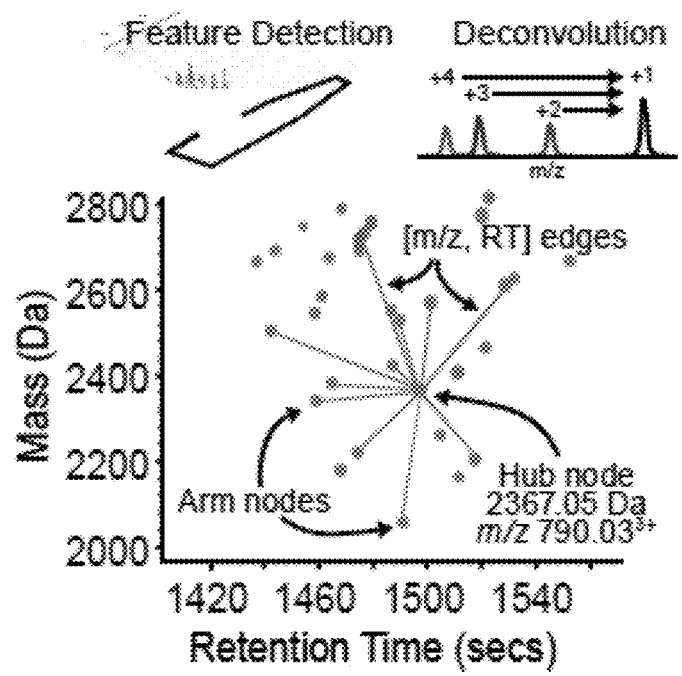
FIG. 2a shows execution of a method to glycoforms of SLHVPGNLK with deconvoluted features being detected from LCMS data and delta mass and RT computed by iterating through each node as a hub node and every other node as an arm node with one iteration being shown in accordance with an example embodiment.

The following examples show execution and results of some example embodiments. Reference is made to FIGS. 2-5 with these figures providing the following:

FIG. 2a shows execution of a method to glycoforms of SLHVPGNLK with deconvoluted features being detected from LCMS data and delta mass and RT computed by iterating through each node as a hub node and every other node as an arm node with one iteration being shown in accordance with an example embodiment.

Figure 2B:
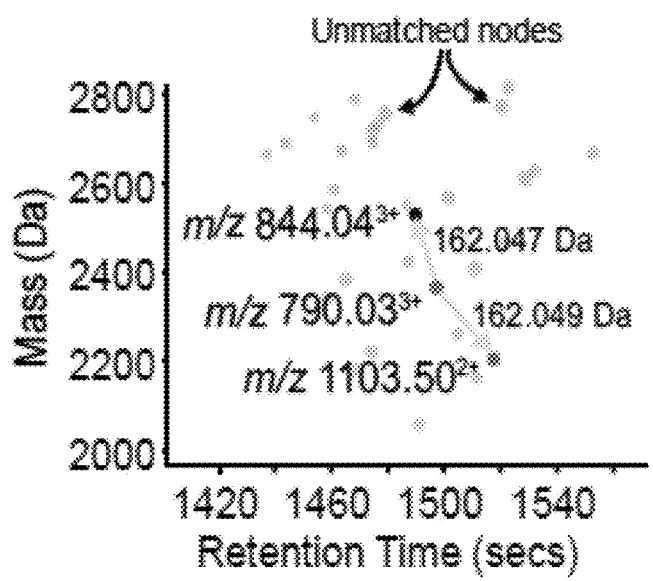
FIG. 2b shows execution of the method to glycoforms of SLHVPGNLK with edges being filtered to have a delta mass corresponding to glycan masses and within a delta RT window in accordance with an example embodiment.

FIG. 2b shows execution of the method to glycoforms of SLHVPGNLK with edges being filtered to have a delta mass corresponding to glycan masses and within a delta RT window in accordance with an example embodiment.

Figure 2C:
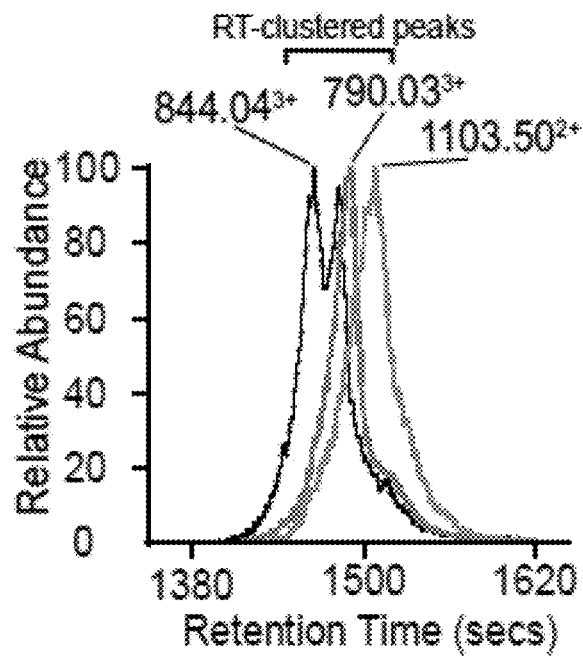
FIG. 2c shows execution of the method to glycoforms of SLHVPGNLK with extracted ion chromatograms of the hub and two arm nodes showing the overlap and close clustering in RT in accordance with an example embodiment.

FIG. 2c shows execution of the method to glycoforms of SLHVPGNLK with extracted ion chromatograms of the hub and two arm nodes showing the overlap and close clustering in RT in accordance with an example embodiment.

Figure 2D:
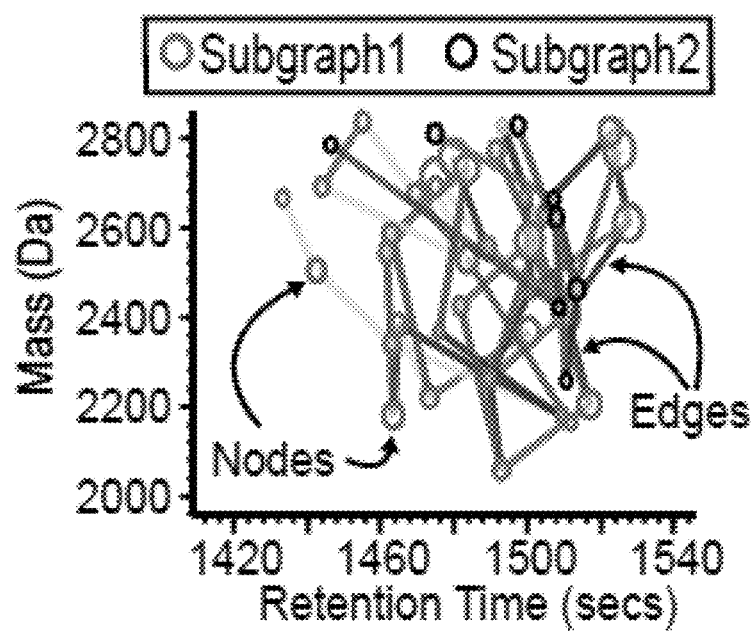
FIG. 2d shows execution of the method to glycoforms of SLHVPGNLK with a graph network of the interconnected nodes in this mass and RT window in accordance with an example embodiment.

FIG. 2d shows execution of the method to glycoforms of SLHVPGNLK with a graph network of the interconnected nodes in this mass and RT window in accordance with an example embodiment. The light green circles are one subgraph while the dark green circles are another subgraph. Edges were colored by predicted glycan composition, as indicated in the legend of FIG. 2e.

Figure 2E:
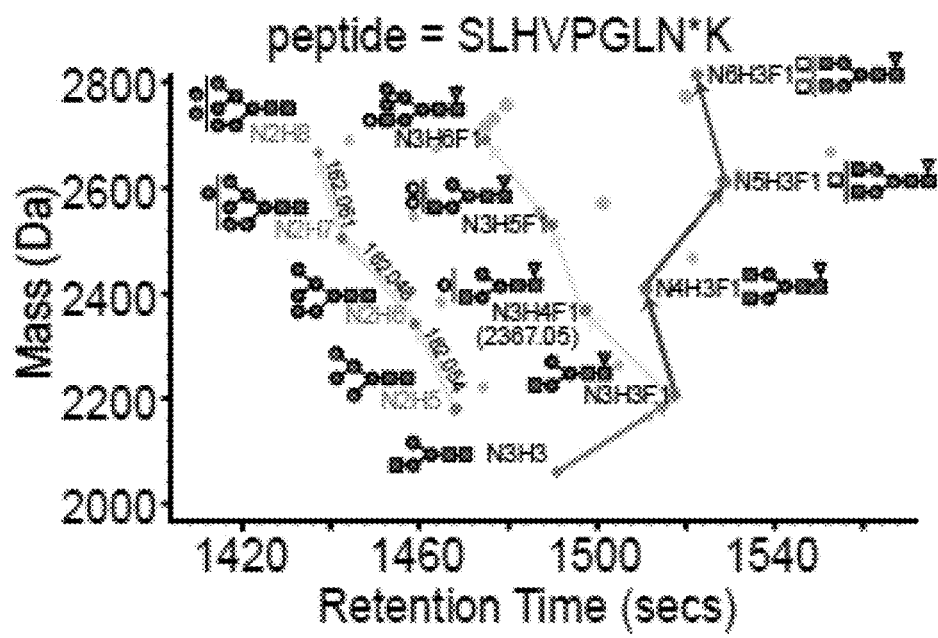
FIG. 2e shows execution of the method to glycoforms of SLHVPGNLK with the SLHVPGLNK glycopeptide compositions predicted by GlycopeptideGraphMS edges being consistent with MS/MS (only some nodes annotated for clarity) in accordance with an example embodiment.

FIG. 2e shows execution of the method to glycoforms of SLHVPGNLK with the SLHVPGLNK glycopeptide compositions predicted by GlycopeptideGraphMS edges being consistent with MS/MS (only some nodes annotated for clarity) in accordance with an example embodiment. Colored arrows trace paths emanating out from smaller to larger glycoforms. The relatively simple high-mannose path was shown on the left and the complex-type paths with branching were shown on the right.

Figure 3A:
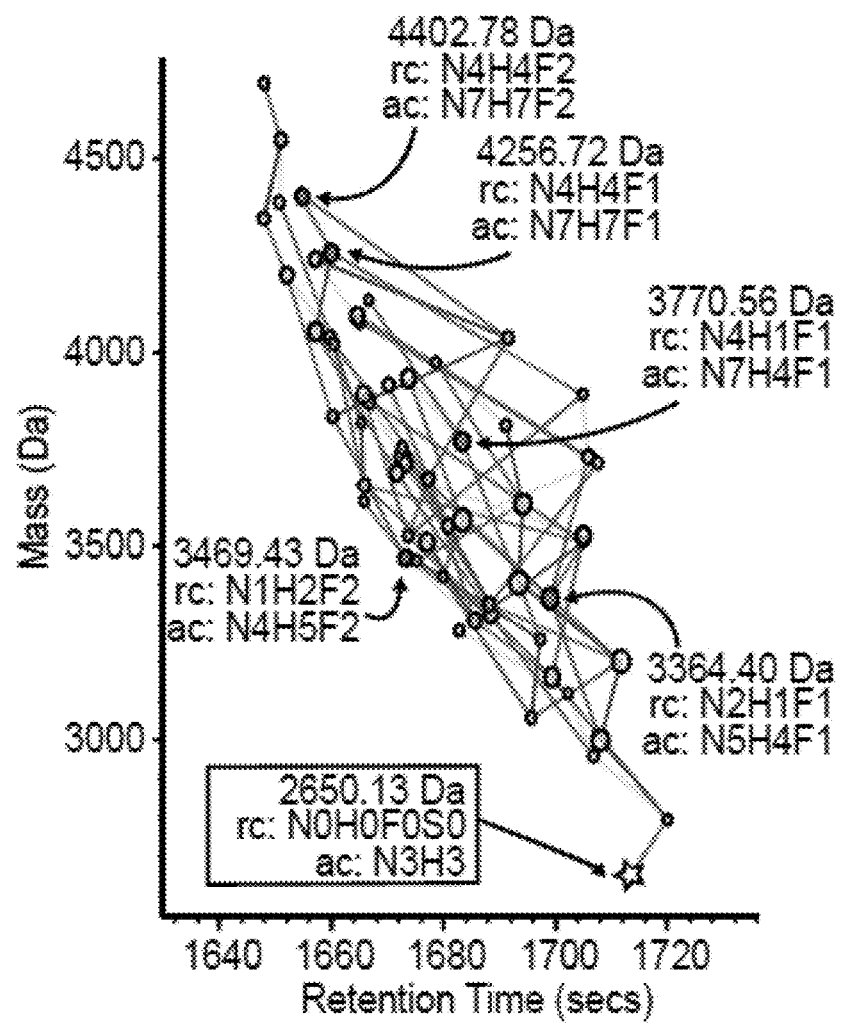
FIG. 3a shows execution of the method predicting glycopeptide composition using reference nodes with a bubble chart being shown of the subgraph of NGSQAFVHWQEPR unsialylated glycoforms as nodes in accordance with an example embodiment.

FIG. 3a shows execution of the method predicting glycopeptide composition using reference nodes with a bubble chart being shown of the subgraph of NGSQAFVHWQEPR unsialylated glycoforms as nodes in accordance with an example embodiment. By setting the 2650.13 Da node as reference node (white star, boxed annotation), the relative compositions ("rc") of the other validation nodes (red-filled circles) were predicted. The absolute compositions ("ac") were confirmed by manually interpreting HCD MS/MS.

Figure 3B:
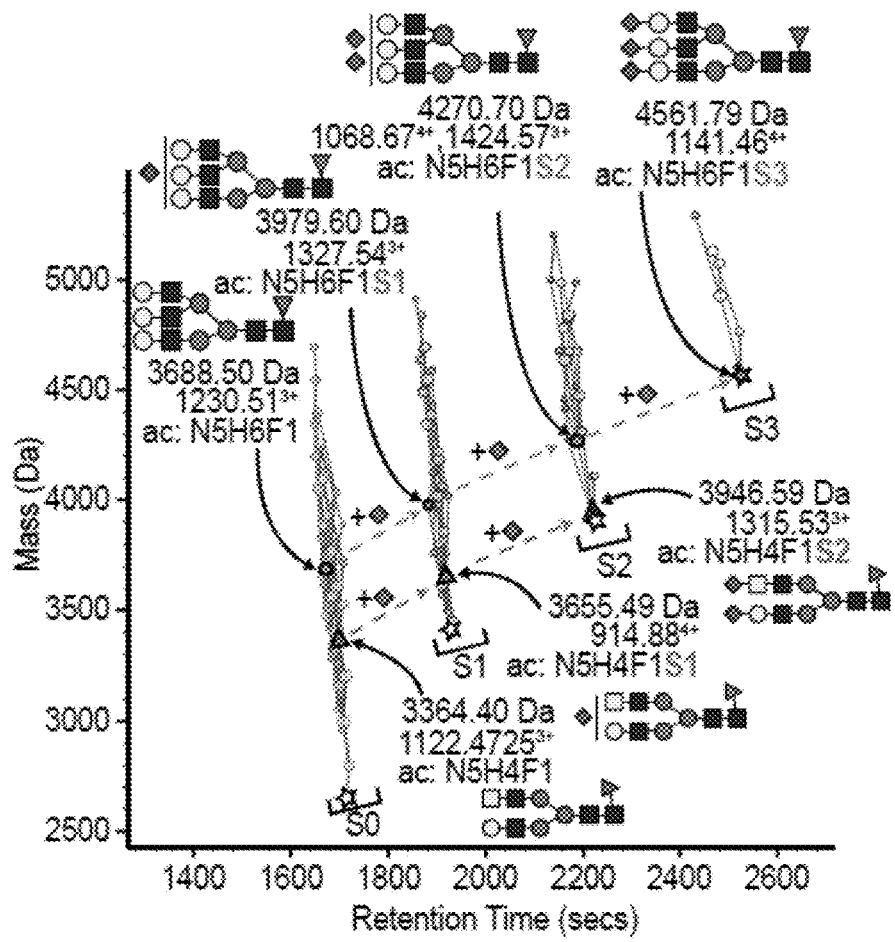
FIG. 3b shows execution of the method predicting glycopeptide composition using reference nodes with a bubble chart showing four clusters separated by additions of sialic acid in accordance with an example embodiment.

FIG. 3b shows execution of the method predicting glycopeptide composition using reference nodes with a bubble chart showing four clusters separated by additions of sialic acid in accordance with an example embodiment. The smallest node in each cluster was arbitrarily set as the reference node (white or blue stars). The four clusters were found to have consistent levels of sialylation (S0-S3), as illustrated by following the levels of sialylation of a biantennary N-glycoform (N5H4F1, pinkfilled triangles) and a triantennary N-glycoform (N5H6F1, blue filled bubbles).

Figure 3C:
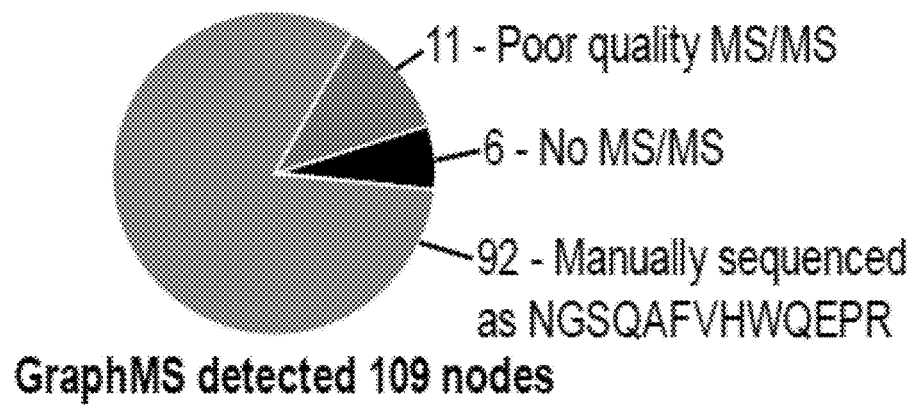
FIG. 3c shows execution of the method predicting glycopeptide composition using reference nodes in which GlycopeptideGraphMS-detected peptide glycoforms were manually confirmed using HCD and EThcD MS/MS, except where prevented by poor quality or absent MS/MS, in accordance with an example embodiment.

FIG. 3c shows execution of the method predicting glycopeptide composition using reference nodes in which GlycopeptideGraphMS-detected peptide glycoforms were manually confirmed using HCD and EThcD MS/MS, except where prevented by poor quality or absent MS/MS in accordance with an example embodiment. None of the nodes had MS/MS contrary to the GlycopeptideGraphMS-predicted composition.

Figure 3D:
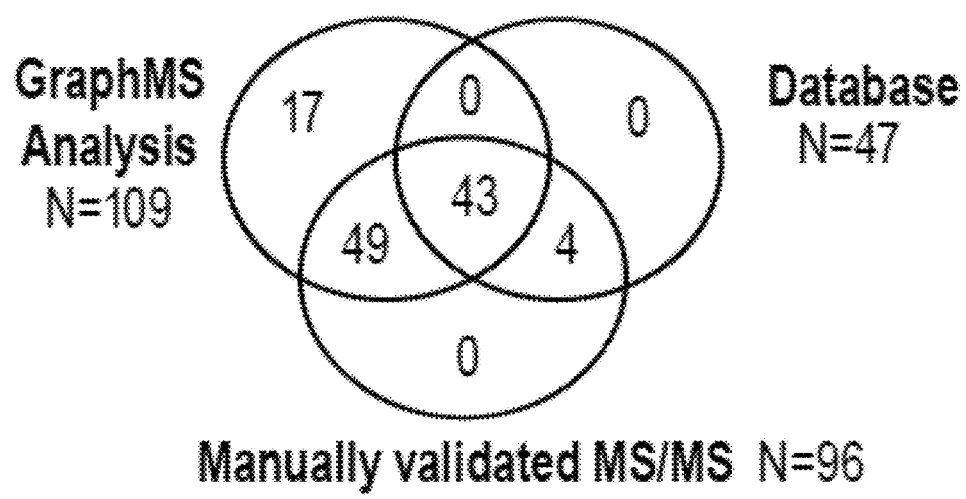
FIG. 3d shows execution of the method predicting glycopeptide composition using reference nodes with a Venn diagram showing that GlycopeptideGraphMS exceeded the database and the manual methods for number of glycopeptides detected in accordance with an example embodiment.

FIG. 3d shows execution of the method predicting glycopeptide composition using reference nodes with a Venn diagram showing that GlycopeptideGraphMS exceeded the database and the manual methods for number of glycopeptides detected in accordance with an example embodiment.

Figure 4A:
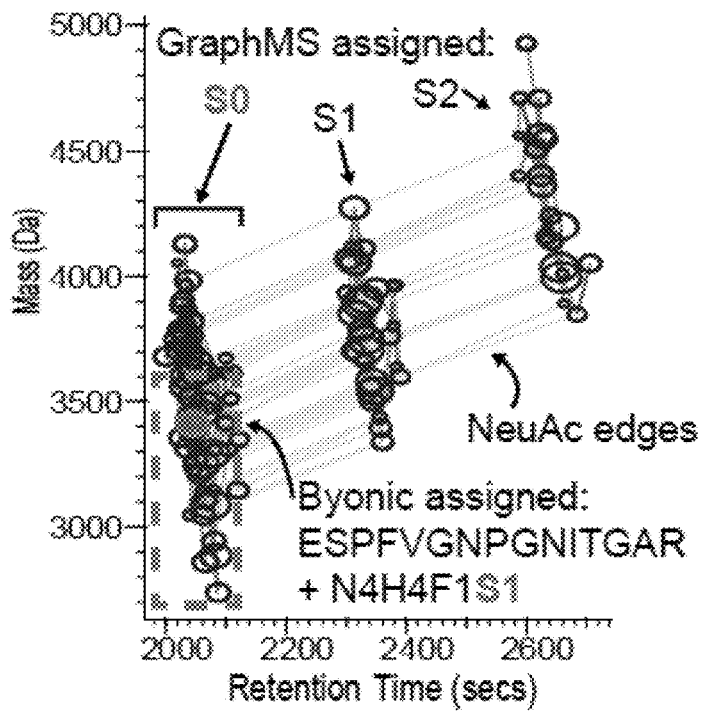
FIG. 4a shows execution of the method that corrected incorrect database assignments and allowed easy visualization of glycopeptides in which a bubble subgraph with three clusters assigned by GlycopeptideGraphMS to have zero (S0), one (S1) and two (S2) NeuAc but Byonic assigned a sialylated N4H4F1S1 peptide into the S0 cluster (red bubble) in accordance with an example embodiment.

FIG. 4a shows execution of the method that corrected incorrect database assignments and allowed easy visualization of glycopeptides in which a bubble subgraph with three clusters assigned by GlycopeptideGraphMS to have zero (S0), one (S1) and two (S2) NeuAc but Byonic assigned a sialylated N4H4F1S1 peptide into the S0 cluster (red bubble) in accordance with an example embodiment.

Figure 4B:
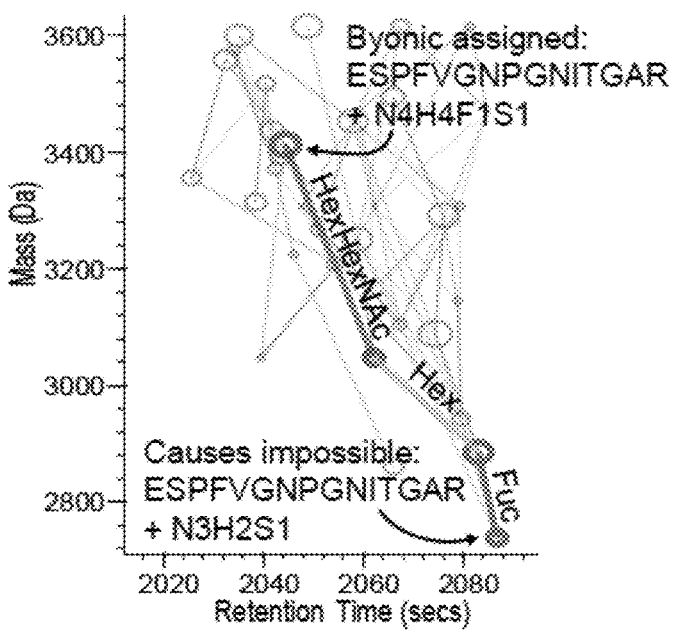
FIG. 4b shows execution of the method that corrected incorrect database assignments and allowed easy visualization of glycopeptides in which the red region for FIG. 4a is magnified in showing the edge path to the impossible composition N3H2S1 implied by Byonic's assignment in accordance with an example embodiment.

FIG. 4b shows execution of the method that corrected incorrect database assignments and allowed easy visualization of glycopeptides in which the red region for FIG. 4a is magnified in showing the edge path to the impossible composition N3H2S1 implied by Byonic's assignment in accordance with an example embodiment.

Figure 4C:
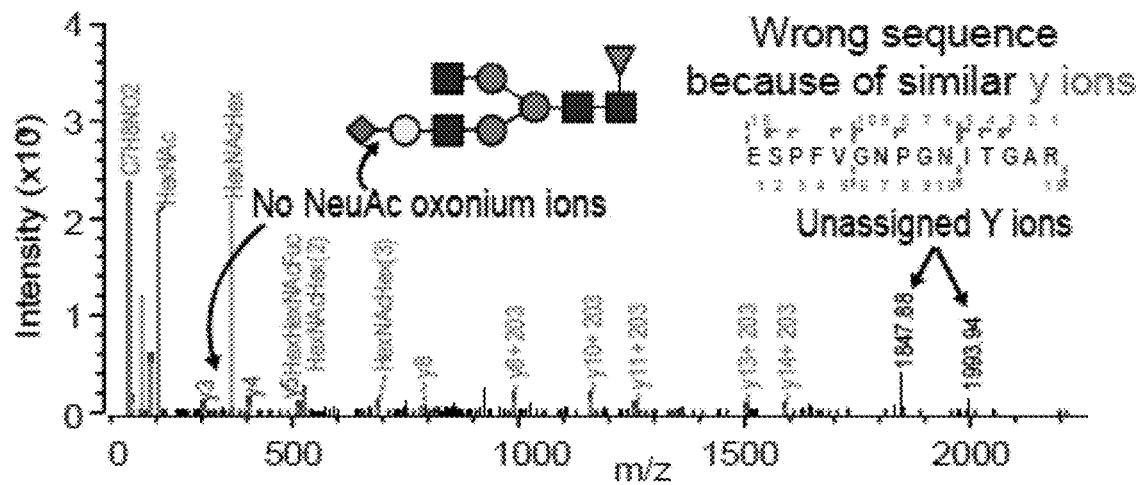
FIG. 4c shows execution of the method that corrected incorrect database assignments and allowed easy visualization of glycopeptides in which HCD MS/MS spectrum of initially is assigned ESPFVGNPGNITGAR+N4H4F1S1 [m/z 1138.4848, 2045.6 s] in accordance with an example embodiment.

FIG. 4c shows execution of the method that corrected incorrect database assignments and allowed easy visualization of glycopeptides in which HCD MS/MS spectrum of initially is assigned ESPFVGNPGNITGAR+N4H4F1S1 [m/z 1138.4848, 2045.6 s] in accordance with an example embodiment. The initial annotation of HCD MS/MS lacked expected NeuAc oxonium ions, b and Y ions. The correct sequence was found by the database search after introducing nonspecific cleavages, which then correctly annotated the major ions with HCD in FIG. 4d and EThcD in FIG. 4e.

Figure 4D:
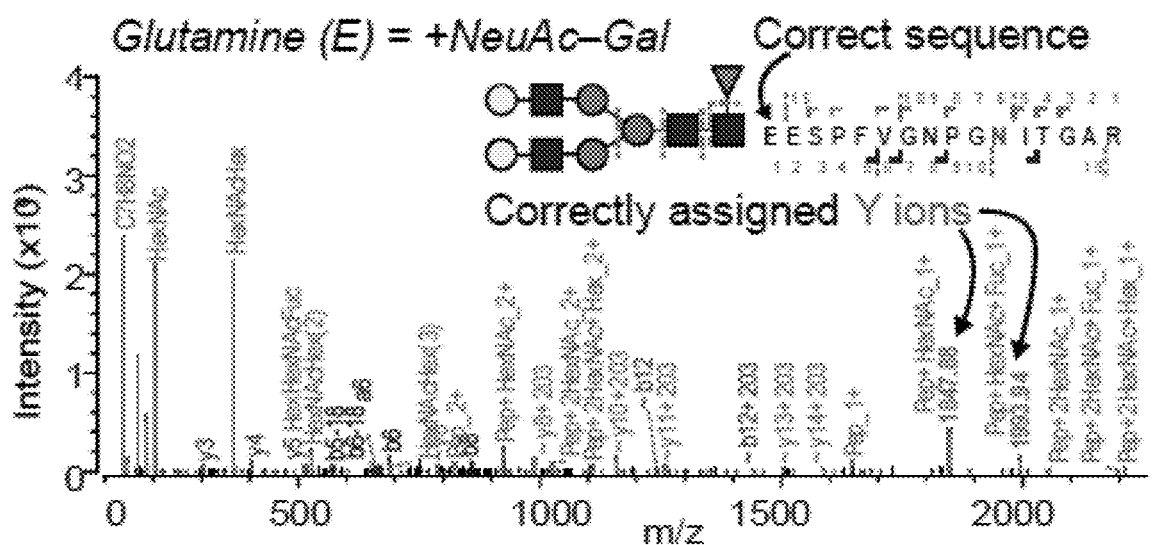
FIG. 4d shows execution of the method that corrected incorrect database assignments and allowed easy visualization of glycopeptides in which the major ions are annotated with HCD in accordance with an example embodiment.

FIG. 4d shows execution of the method that corrected incorrect database assignments and allowed easy visualization of glycopeptides in which the major ions are annotated with HCD in accordance with an example embodiment.

Figures 4E, 4F:
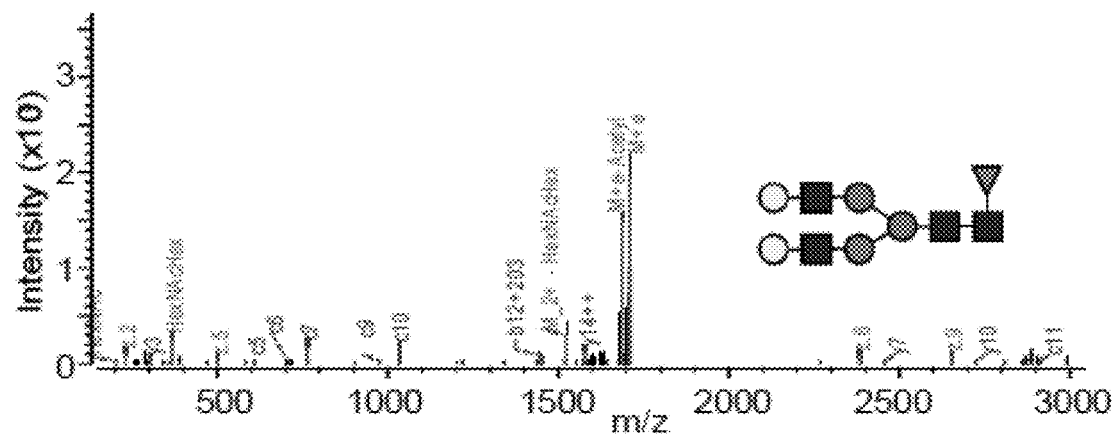
FIG. 4e shows execution of the method that corrected incorrect database assignments and allowed easy visualization of glycopeptides in which major ions are annotated with EThcD in accordance with an example embodiment.
FIG. 4f shows execution of the method that corrected incorrect database assignments and allowed easy visualization of glycopeptides in which AXL glycopeptides were visualized using GlycopeptideGraphMS in accordance with example embodiments.

FIG. 4e shows execution of the method that corrected incorrect database assignments and allowed easy visualization of glycopeptides in which major ions are annotated with EThcD in accordance with an example embodiment.

FIG. 4f shows execution of the method that corrected incorrect database assignments and allowed easy visualization of glycopeptides in which AXL glycopeptides were visualised using GlycopeptideGraphMS in accordance with example embodiments. In this figure, colors represent different peptide sequences and "pep1915" was an unknown 1915 Da peptide backbone with various glycoforms.

Figure 5A:
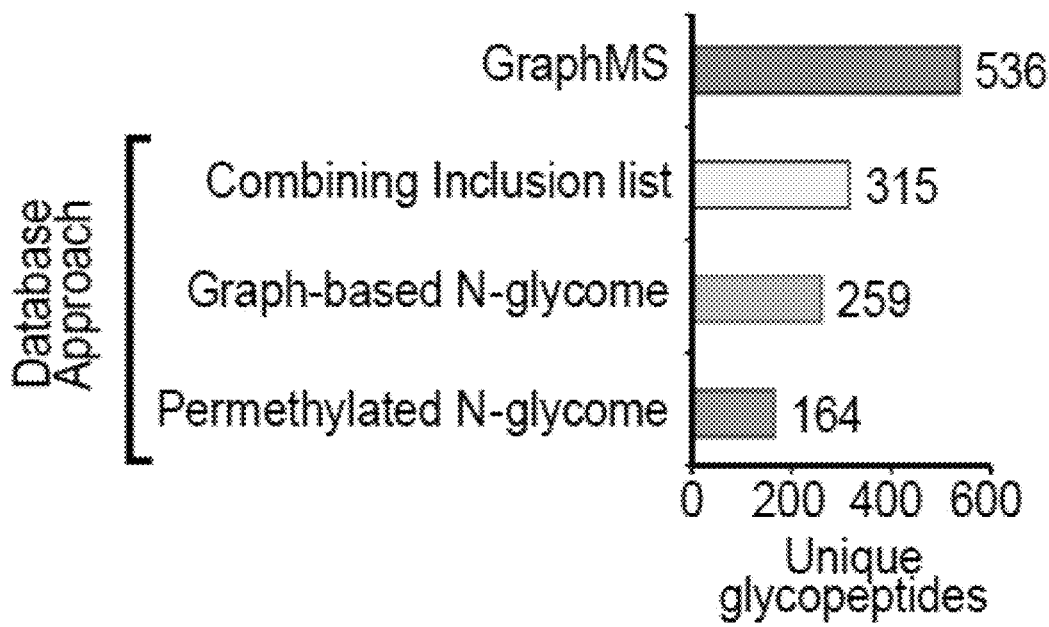
FIG. 5a shows a graph in which execution of the method detected more unique glycopeptides than different database approaches in accordance with an example embodiment.

FIG. 5a shows a graph in which execution of the method detected more unique glycopeptides than different database approaches in accordance with an example embodiment. The figure shows unique glycopeptides detected by each method. GlycopeptideGraphMS glycopeptides were chosen from FIG. 4f. For the database approaches using Byonic, the N-glycan list was from either the permethylated MALDI based N-glycome or combined with the compositions predicted by GlycopeptideGraphMS. Fragmentation was by HCD and product-ion triggered EThcD and detected using an Orbitrap. The "combining inclusion list" dataset was a merger of all the MS/MS from two data-dependent acquisition runs and from a third run with an inclusion list.

Figure 5B:
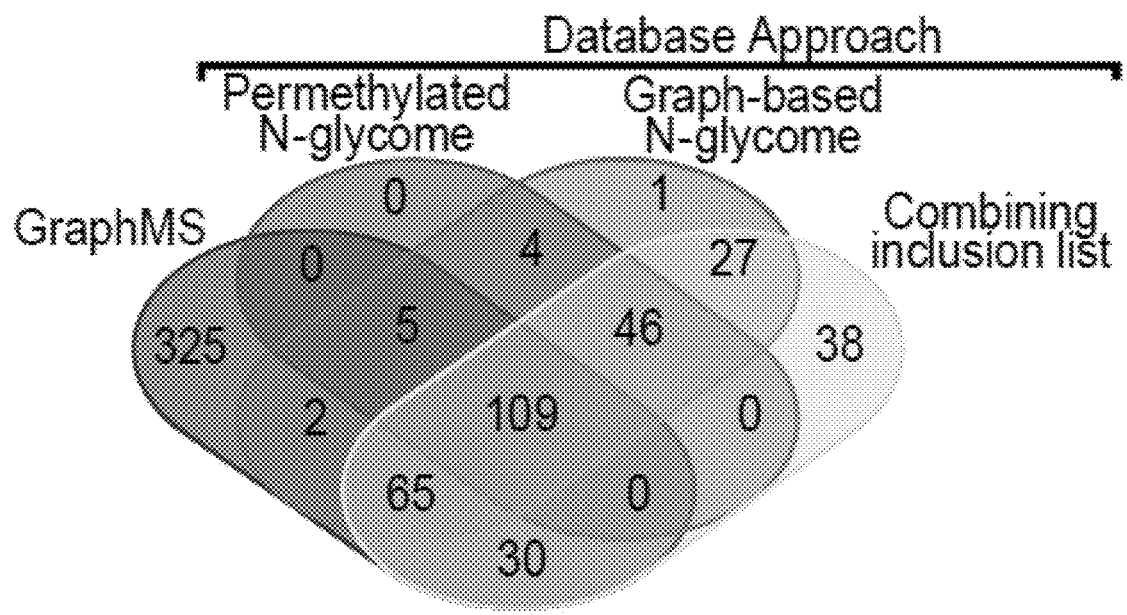
FIG. 5b shows a Venn diagram in which execution of the method detected more unique glycopeptides than different database approaches in accordance with an example embodiment.

FIG. 5b shows a Venn diagram in which execution of the method detected more unique glycopeptides than different database approaches in accordance with an example embodiment. The Venn diagram shows the overlap of unique glycopeptides (i.e. peptide sequence and glycan composition) between all four result sets, with GlycopeptideGraphMS identifying more glycopeptides than the other approaches.

Sample preparation for LCMS. Lyophilised peptides from 50 µg of AXL (Uniprot P30530, Met1-Pro449 with polyhistidine tag) recombinantly produced in HEK293 cells (>98% pure, SinoBiological Inc.) were prepared following a previously described filter aided sample preparation method. Sequencing grade trypsin was used (1:50 weight ratio, Promega, WI, USA) and Glutaminase-C (1:50 weight ratio, GluC, Promega, WI, USA) was added 4 hours after Trypsin was added.

Liquid Chromatography-Mass Spectrometry. Peptides (500 ng) were injected into an Orbitrap Fusion Tribid mass spectrometer using a nano LC system (Ultimate 3000 RSLCnano, Thermo Fisher Scientific). Peptides were desalted on a C18 trap column and separated on a C18 EASY-SprayPepMap RSLC analytical column at 40° C., 300 nL/min, and with a 104 min gradient from 2% to 50% acetonitrile with 0.1% formic acid. The MS1 profile scans of m/z 300-2500 were acquired using the Orbitrap at 120,000 resolution in positive mode. Data dependent MS/MS scans using HCD at normalized collisional energy (NCE) 30% were acquired by the Orbitrap at 30,000, m/z 130-2500. The glycopeptide-specific N-acetylhexosamine (HexNAc) ion at m/z 204.0867 was used to trigger EThcD for peptide sequencing. For the exoglycosidase digested peptides, data dependent MS/MS scans using HCD NCE25%±5% were acquired using the ion trap at m/z 150-2000.

Data pre-processing. Raw data obtained from the Orbitrap Fusion was converted to the open source .mzML format using MSConvert (included with ProteoWizard v3.0.9393). Using a KNIME (v3.3.2) pipeline constructed from OpenMS (v2.1.0.201707101954) modules, LCMS features from the data were extracted, deconvoluted and exported as a .csv file listing each feature with its neutral mass, apex RT and summed intensity. The feature finding and deconvolution parameters were optimised by manually checking that representative features across the m/z and intensity range and of charge states 2 to 5 had the correct monoisotopic peak and correct apex RT when compared with the MS1 raw data. The optimum settings resulted in 91% accuracy in detecting the monoisotopic peak (although x+1 and x+2 peaks were often also detected in the late-eluting tails of the features).

Training and test dataset specification. The initial training dataset was the SLHVPGLNK peptide's unsialylated glycoforms from AXL, identified manually by MS/MS annotation and extracted by restricting the RT window to 20-26.67 min, inclusive of noise or unrelated peaks. Glycopeptides were identified by observing glycan oxonium ions at m/z 204, 366, 406 and 528 corresponding to HexNAc, hexose linked to N-acetylhexosamine (HexHexNAc), HexNAc2 and Hex2HexNAc and the characteristic ions at m/z 964, 1167 and 1370 corresponding to peptide, peptide+HexNAc (Y1 ion) and peptide+HexNAc2 (Y2 ion). To benchmark the training dataset, a database search was conducted using Byonic software, initially loaded with a glycan database composed of all the compositions found from the MALDI-TOF-TOF analysis of released and permethylated N-glycans from AXL. To limit the search, the peptide database in Byonic was set to the sequence QRSLHVPGLNKST with tryptic digest with zero missed cleavages. The validation dataset was all the NGSQAFVHWQEPR peptide glycoforms from AXL with up to four sialic acid residues. The final dataset was the whole LCMS dataset generated from the AXL peptides (including the two earlier datasets).

GlycopeptideGraphMS algorithm. GlycopeptideGraphMS converted LCMS features into the nodes of a graph network. The algorithm then detected nodes between which the mass and RT differences matched a predefined list of masses of mono/disaccharide residues, namely Hex, HexNAc, fucose (Fuc and HexHexNAc (FIG. 1a&b). Pairs of nodes were within a set RT window (30 s for Hex and Fuc, 50 s for HexNAc), which was dependent on the LC gradient used and had to be determined manually at first. The mass and RT differences were represented as connections between nodes, that is, graph theoretic edges. In this way, RT-clustered nodes differing by a glycan mass were connected to each other in a mathematical graph. Connecting these identified nodes produced a series of subgraphs—clusters of connected nodes with no connection to other clusters.

To reduce coincidental and false matches, only those subgraphs having more than 3 nodes were chosen. Reducing the threshold to 2 nodes resulted in many more redundant and incorrect matches, (data not shown). To combine related but RT-distant subgraphs, the number of nodes that differed by the mass and RT shift of N-acetylneuraminic acid (NeuAc, delta mass 291.0954±0.02 Da, delta RT 100 s to 500 s) between pairs of subgraphs was calculated. Those subgraphs with more than 60% match of nodes were combined as sialoforms and plotted. The 60% threshold was set for all AXL experiments to ensure that at least half of the subgraph could be linked by NeuAc edges to the other subgraph, but this threshold is subject to optimization for different kinds of samples. The parameters for glycan differences and the NeuAc clustering are easily customized by the user in the form of a comma-separated-value file that can be opened in a text editor or Microsoft Excel, and different glycans such as xylose, NeuGc or even 0-acetylated NeuAc can be easily specified (see example in Supplementary Table S2, User Guide for GlycopeptideGraphMS software). The two common sialic acids NeuAc (291.0954 Da) and NeuGc (307.0903 Da) would be distinguishable based on mass. However, as the AXL protein was recombinant produced in the human cell line HEK293, no NeuGc was present.

Exoglycosidase digests of AXL peptides to estimate FDR. As an orthogonal test of glycopeptide identity to supplement the peaks not selected for HCD MS/MS, 4 AXL glycopeptides were digested with different exoglycosidases, as follows. As a negative control, condition 1 was with LCMS-grade water added instead of enzyme. Condition 2 was 15 milliunits of α2-3,6,8,9 Sialidase A 51 (Prozyme GK80045). Condition 3 was 15 milliunits of β1-3,4 galactosidase (Prozyme GKX-5013) and 120 milliunits of β1-2,3,4,6 N-acetylglucosaminidase (Prozyme GK80050, no activity to GalNAc). Conditions 1, 2 and 3 were buffered with 5 mM $CaCl_2$ 50 mM sodium acetate pH 5.5. Condition 4 was 450 milliunits of a1-2,3,6 mannosidase (Prozyme GKX-5010) and 120 milliunits of a1-6 mannosidase (New England Biolabs P0727), in 100 mM sodium acetate, pH 5.0, 2 mM $Zn^{2+}$. All conditions had 0.1 mg/ml BSA and final volumes were 12 µl. Digestion was overnight at 37° C. and the enzymes were removed by centrifuging through a 10 kDa molecular weight cut-off filter (Pall) and the eluant was lyophilised. Peptides from each condition were injected thrice (one biological replicate each condition).

Quantitation between exoglycosidase datasets. Sensitivity or resistance to exoglycosidase would indicate a peak was a glycopeptide or not. The GlycopeptideGraphMS subgraph of NGSQARVHWQEPR peptide glycoforms from the negative control (no exoglycosidase) were chosen to calculate FDR. Deconvoluted intensity was computed using KNIME/OpenMS. To allow quantitative comparison between the four conditions, each replicate was normalized by dividing by the geometric mean of two enzyme-resistant nodes (expected based on composition to be neither substrate nor product of the exoglycosidases). The geometric mean was used as it prevented weighting bias due to magnitude. For the control versus sialidase datasets, the N3H3 and N3H3F1 nodes were chosen. For control versus galactosidase plus N-acetylglucosaminidase, the chosen nodes were N7H7F1S4 and N7H6F1S4. For the control versus mannosidase, the chosen nodes were N7H6F1S3 and N7H6F1S4. The notation used was N for HexNAc, H for Hex, F for Fuc and S for NeuAc. Statistical signifiance was calculated using the FDR approach. The node's glycan composition that was predicted by GlycopeptideGraphMS was deemed correct upon a statistically significant decrease when treated with an exoglycosidase expected to digest that predicted composition, as well as resistance to those exoglycosidases for which the composition was not a substrate.

Database search. To benchmark the performance of the GlycopeptideGraphMS algorithm, a database search was done using the Byonic software (ProteinMetrics, CA, USA). The FASTA protein sequence inputted into the Byonic software was the amino acids 1-449 of AXL (P30530-1 in Uniprot) with six additional C-terminal histidines. The glycan database was generated from compositions detected by MALDI-TOF of permethylated N-glycans from AXL and/or the glycan compositions detected by GlycopeptideGraphMS. Up to two missed cleavages were allowed to the C-terminus of R, K, D and E (that is, Trypsin and GluC). Carbamidomethylation or carboxymethylation was set as fixed modifications to cysteine depending on the experiment, and a single oxidation of methionine was allowed as variable modification. Tolerance was set at 25 ppm for precursors and fragments when using the Orbitrap as detector, and 0.3 Da when using the ion trap as mass analyzer. Only peptides with Byonic score more than 30 were considered. DecoyPyRat was used to scramble the AXL sequence to generate the decoy peptides.

Combining MS datasets to increase glycopeptide identifications using the database approach. To see if coverage could be improved by adding GlycopeptideGraphMS-identified glycan compositions to the glycan database used for searching, three sequential database searches using Byonic were conducted, each time augmenting the initial glycan database used with the glycan compositions detected by GlycopeptideGraphMS. The first search was done using the MALDI permethylated N-glycome. Secondly, on the same dataset, the glycan database was updated with additional compositions detected by GlycopeptideGraphMS and coverage was calculated. Thirdly, an MS/MS inclusion list was created out of the GlycopeptideGraphMS putative hits minus the already-identified peaks, the sample was rerun and the MS/MS spectra from three experiments were merged using KNIME/OpenMS. Venn diagrams were generated using an online tool.

GlycopeptideGraphMS detected peptide glycoforms. To conduct graph theoretical analyses on the LCMS data, the AXL glycopeptide dataset was first reduced from mass spectra to a list of pairs of [mass, RT] of detected analytes by feature finding and deconvolution using OpenMS/KNIME and plotted in 2D space (FIG. 2a). Mass and RT differences were computed by comparing all combinations of pairs of nodes in the dataset (FIG. 2a). Those differences with delta mass equal to the residual mass of Hex, HexNAc, Fuc or HexHexNAc and delta RT £ 50 seconds were converted to graph theoretic edges (i.e., a line) between nodes (FIGS. 2b and c). In this way, GlycopeptideGraphMS joined subsets of nodes into subgraphs, where a subgraph was defined as an isolated group of nodes that were connected to each other but not connected to any other nodes in the graph (FIG. 2d & e).

GlycopeptideGraphMS was validated by correctly identifying the training set of 25 known glycopeptides from the AXL peptide SLHVPGNLK. N-acetylneuraminic acid (NeuAc) edges were computed in a second stage only after Hex, HexNAc, Fuc or HexHexNAc using a different RT window that reflected the much larger effect on RT due to NeuAc.

Unknown glycopeptides can be predicted accurately. Having shown that GlycopeptideGraphMS could cluster peptide glycoforms into subgraphs, the extent to which peptide glycoforms could be identified without the use of MS/MS was evaluated. As the GlycopeptideGraphMS approach uses relative compositions, there was a need to arbitrarily select a single reference node with unambiguous MS/MS and first identify its absolute glycopeptide composition using the database approach. Then, the predictions of GlycopeptideGraphMS about the rest of the subgraph were made without referring to MS/MS fragments. These predictions were checked by interpreting MS/MS manually and using the Byonic database software. Predictions were made by tracing the paths of mono-/disaccharide gains or losses from the reference node to all the other nodes of the same subgraph (FIG. 3a).

For the NGSQAFVHWQEPR glycoform validation set, when NeuAc edges were initially excluded, GlycopeptideGraphMS detected a subgraph of the unsialylated peptide glycoforms. First, the reference node was arbitrarily chosen as the node at 2650.13 Da (smallest mass). Then, five distant nodes were chosen, spanning the breadth of the subgraph (FIG. 3a). By tracing the path of monosaccharide additions or subtractions from the reference node, the relative compositions (rc) of these nodes were determined (FIG. 3a). Having calculated the relative compositions, MS/MS sequencing the one reference node at 2650.13 Da (true composition N3H3) was sufficient to predict the absolute compositions (ac) of the unknown nodes, which were 3364.40 Da, 3469.43 Da, 3770.56 Da, 4256.72 Da and 4402.78 Da corresponding to predicted N5H4F1, N4H5F2, N7H4F1, N7H7F1, and N7H7F2, respectively. These glycan compositions were confirmed with the manual and database-based interpretation of the MS/MS of those nodes on the basis of oxonium ions, peptide fragments and glycan neutral losses. Extending from this unsialylated subgraph, the analysis was repeated for three more subgraphs that corresponded to the addition of one, two and three sialic acids (FIG. 3b). For each sialylated subgraph, a reference node (demarcated with a black unfilled star) was used and the predicted compositions had sialylation consistent within each subgraph. For example, the triantennary glycoforms N5H6F1, N5H6F1S1, N5H6F1S2 and N5H6F1S3 were observed over each of the four subgraphs and the biantennary glycoforms N5H4F1, N5H4F1S1 and N5H4F1S2 were separated over three subgraphs (FIG. 3b).

GlycopeptideGraphMS identified 100% (92/92) of glycopeptides that could be manually sequenced, and also identified an additional 17 glycopeptides, of which 11 were glycopeptides but lacked peptide information, and 6 lacked MS/MS and could not be sequenced at all (FIG. 3c). GlycopeptideGraphMS outperformed the database search by an additional 95.7% (92 vs. 47) of manually-validated glycopeptides (FIG. 3d).

False-positive rates were determined orthogonally by exoglycosidases and MS/MS. Fragmentation MS/MS data was not available for all nodes especially those with low abundance. Therefore, the experimental FDR of GlycopeptideGraphMS-predicted NGSQAFVHWQEPR nodes was estimated by digestion with three combinations of exoglycosidases (separately, not sequentially) to see if each node could be depleted according to expected exoglycosidase specificity. The subgraph of NGSQAFVHWQEPR in the untreated negative control dataset had 144 unique glycoforms. Eight low abundance nodes were only present in one replicate and excluded from analysis, giving a final list of 136 nodes. This list was larger than the initial run detecting 109 nodes in FIG. 3 because of higher sensitivity due to the Orbitrap detector being dedicated to collect only MS spectra instead of splitting the Orbitrap duty cycle between collecting MS and MS/MS spectra. Fragmentation MS/MS fragments were instead detected using the Ion Trap detector. After using an FDR method (expected Q=10%) to correct for multiple hypotheses testing, 132 nodes were deemed correct because they were digested or were resistant consistent with the predicted compositions.

Due to high standard deviation for some low abundance nodes, 4 nodes had conflicting or ambiguous results due to large standard deviation, but of which one had its composition confirmed by manual interpretation of MS/MS. Therefore, combining exoglycosidase and MS/MS analysis resulted in a total of 3 nodes deemed as false positives. This in turn yielded an experimental FDR of 2.21% (3/136) and a true positive rate of 97.79% (117/136). The low experimental FDR suggested that GlycopeptideGraphMS could reliably group together peptide glycoforms. From our observation that all nodes in a subgraph have the same peptide backbone, a corollary is that sequencing a single node is sufficient to identify the glycan and peptide composition of the whole subgraph. Therefore, a single unambiguous MS/MS could be used to identify more than a hundred glycopeptides, which is useful when many of those glycopeptides are too low for informative MS/MS. Additionally, if the FDR is suspected to be high, two or three additional MS/MS from different nodes can be included to ensure confident assignment of the subgraph.

Identifying non-database and unexpected glycopeptides. A database-dependent glycopeptide identification approach (Byonic) initially confidently assigned ESPFVGNPGNIT-GAR+N4H4F1S1 [m/z 1138.4848, 2045.6 s] on the basis of intense y ions (FIG. 4a & c). Further validation from manual interpretation agreed with the assignment of ions, except in the case of two unassigned ions with high m/z (FIG. 4c). This inaccuracy was detected by GlycopeptideGraphMS because (1) this glycopeptide was found in a cluster of unsialylated glycopeptides and (2) this assignment would result in the impossible glycan composition N3H2S1 at the bottom of the subgraph (FIG. 3a & b). The correct sequence was determined manually by HCD and EThcD to be EESPFVGNPGNITGAR+N4H5F1, which resulted from a nonspecific cleavage after alanine (i.e. GTQA/EESPF) introducing an extra glutamic acid (FIG. 4c-e). To the database, which was generated in silico and could not account for the extra glutamic acid, the missing glutamic acid was mathematically compensated for by adding NeuAc and removing Gal from the glycopeptide but this resulted in the wrong sequence (FIG. 4c). The correct assignment resulted in the smallest node having the sensible glycan composition N3H3 instead of N3H2S1, adding confidence to the assignment. The correct sequence could only be detected by Byonic after allowing non-specific cleavages, demonstrating that the mis-assignment was not a limitation of the Byonic software but rather a general limitation of the database approach (FIG. 4d & e). In this way, use of RT-clustering and glycan compositions of neighboring nodes surpassed the accuracy of the database approach and allowed comprehensive annotation and visualisation of AXL glycopeptides (FIG. 4f).

GlycopeptideGraphMS detected more unique glycopeptides than the database approach. GlycopeptideGraphMS found 536 unique glycopeptides from a single run, an improvement of 70% over the best-case database search, or 227% over the search using MALDI-TOF N-glycans (FIG. 5a). Byonic loaded with the list of compositions found by MALDI-TOF of permethylated glycans found only 164 unique glycopeptides because the search ignored N-glycans not in the list. Expanding the N-glycan list using the compositions predicted by GlycopeptideGraphMS improved the database result by 58%. These extra glycans were at the noise level in the MALDI-TOF spectrum and therefore had not been initially identified. The best-case scenario for the database approach was created by merging two data-dependent runs and one run with an inclusion list. This best-case search found 315 unique glycopeptides, 92% more than the search with the MALDI-TOF N-glycome but only 59% of what GlycopeptideGraphMS achieved.

GlycopeptideGraphMS detected 325 new glycopeptides that were not detected using the database approach. This improvement was explained in that the database approach had a much lower FDR of 0.27% compared to the FDR of 2.2% for GlycopeptideGraphMS. In other words, the database approach would detect fewer but more confident hits. This was expected since the database approach uses the much more specific method of MS2 fragmentation to make the identification. The GlycopeptideGraphMS FDR of 2.2% is acceptable because more hits are found, a more comprehensive identification is achieved (which is still lacking in glycoproteomics) and MS2 is not required for the new hits as long as a confident MS2 is present in the same graph.

A glycoproteomic solution to a glycoproteomic problem. In proteomic database-driven and de novo approaches, MS/MS spectra are analyzed in isolation to each other because tryptic peptides eluting with similar RT can only be related by hydrophobicity and do not necessarily share sequence similarity. Consistent with the glycoproteomic paradigm, peptide glycoforms do occur in predictable mass and narrow RT windows and GlycopeptideGraphMS could exploit such patterns to detect and group those glycosylated peptides with identical peptide backbones (FIG. 3). The approximate size of the RT window must be determined for different chromatographic conditions, which can be performed using a standard N-glycoprotein. Importantly, GlycopeptideGraphMS tripled (3.3×) the number of detected unique glycopeptides compared to the typical database search loaded with glycan compositions found by a released-glycan experiment and found 325 additional unique glycopeptides (FIG. 5). This may be because the database approach is limited by underutilizing glycopeptide relationships and the stochastic nature of obtaining high-quality MS/MS, which GlycopeptideGraphMS overcame.

Extensibility of GlycopeptideGraphMS to other glycoconjugates. That GlycopeptideGraphMS was able to detect glycopeptides at near-zero false-positive rates without the need for extensive MS/MS meant that its sensitivity would exceed any current database or de novo method, which both rely on MS/MS. We propose the inclusion of RT behavior and clustering properties as orthogonal non-fragmentation approaches to systematically confirm or refute assignments made by database-dependent approaches (FIG. 4). Refutations of assignments can lead to the identification of unexpected but correct glycopeptides, which otherwise would be wrongly assigned or ignored by database approaches, as in the case presented (FIG. 4).

Although GlycopeptideGraphMS was demonstrated on N-glycopeptides, it is in principle applicable to O-glycopeptides, other glycoconjugates and with modified glycans simply by changing the parameter text file fed to the software (NeuAc acetylation and O-glycopeptides have been tested successfully, data not shown). Other post-translational modifications such as phosphorylation and oxidation are not suitable for this approach because these modifications are only a single mass and GlycopeptideGraphMS requires the heterogeneity of 3 or more masses (and thus 3 or more glycoforms) per peptide for detection.

GlycopeptideGraphMS took a list of deconvoluted masses and their intensities from an LCMS dataset and identified hundreds of glycopeptides without the need for extensive or complete MS/MS, and at an FDR of 2.21%. This was possible as long as the peptide and glycan sequence for one reference peak per subgraph was known through a separate MS/MS analysis and/or database search. In other words, instead of one MS/MS yielding one identification, each MS/MS could be made to yield up to even a hundred identifications. GlycopeptideGraphMS supersedes current database-dependent methods for glycopeptide analysis and enables investigators to visualize their data, achieve greater coverage of site-specific glycosylation and increase confidence in identification. Improving the resolution and depth of knowledge about protein glycosylation enables deeper questions to be asked about the structure and function of clinically relevant glycoproteins. Furthermore, increasing evidence for non-canonical glycosylation suggests that sequence-agnostic methods such as GlycopeptideGraphMS will be needed.

Figure 6:
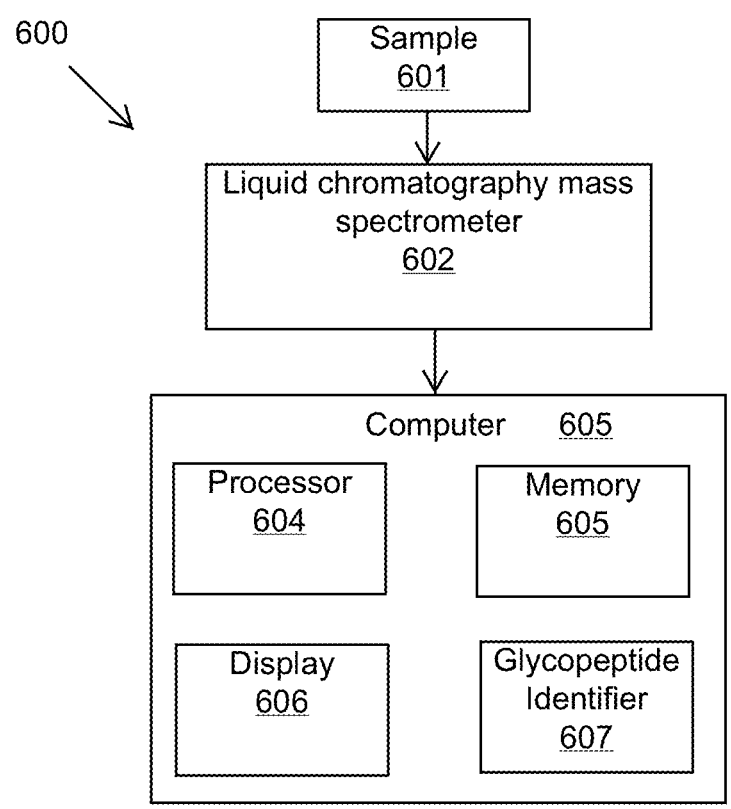
FIG. 6 is a computer system in accordance with an example embodiment.

FIG. 6 is a computer system 600 in accordance with an example embodiment. The computer system 600 includes one or more samples (601) being investigated and a liquid chromatography mass spectrometer (602) coupled to or in communication with a computer 605. The computer 605 includes one or more processors 604 that execute example embodiments, a memory 605 (including memory that stores code or instructions of example embodiments), a display 606 (or other output module), and a glycopeptide identifier 607 (including code and instructions for executing methods in accordance with example embodiments).

In some example embodiments, the methods illustrated herein and data and instructions associated therewith, are stored in respective storage devices that are implemented as computer-readable and/or machine-readable storage media, physical or tangible media, and/or non-transitory storage media. These storage media include different forms of memory including semiconductor memory devices such as DRAM, or SRAM, Erasable and Programmable Read-Only Memories (EPROMs), Electrically Erasable and Programmable Read-Only Memories (EEPROMs) and flash memories; magnetic disks such as fixed and removable disks; other magnetic media including tape; optical media such as Compact Disks (CDs) or Digital Versatile Disks (DVDs). Note that the instructions of the software discussed above can be provided on computer-readable or machine-readable storage medium, or alternatively, can be provided on multiple computer-readable or machine-readable storage media distributed in a large system having possibly plural nodes. Such computer-readable or machine-readable medium or media is (are) considered to be part of an article (or article of manufacture). An article or article of manufacture can refer to a manufactured single component or multiple components.

Blocks and/or methods discussed herein can be executed and/or made by a software application, an electronic device, a computer, firmware, hardware, a process, a computer system, and/or an engine (which is hardware and/or software programmed and/or configured to execute one or more example embodiments or portions of an example embodiment). Furthermore, blocks and/or methods discussed herein can be executed automatically with or without instruction from a user.

While exemplary embodiments have been presented in the foregoing detailed description of the present embodiments, it should be appreciated that a vast number of variations exist. It should further be appreciated that the exemplary embodiments are only examples, and are not intended to limit the scope, applicability, operation, or configuration of the invention in any way. Rather, the foregoing detailed description will provide those skilled in the art with a convenient road map for implementing exemplary embodiments of the invention, it being understood that various changes may be made in the function and arrangement of steps and method of operation described in the exemplary embodiments without departing from the scope of the invention as set forth in the appended claims.

What is claimed is:

1. A method for identifying glycopeptides in a sample, the method comprising:
   converting a mass spectrum of MS1 precursors of the sample into a plurality of nodes in a graph, each node corresponding to one mass and one retention time of a glycopeptide to be identified in the sample;
   calculating differences in the mass and/or retention time between all combinations of pairs of the nodes;
   generating a graph theoretic network of the nodes; and
   predicting compositions of the glycopeptides in the sample based on the graph theoretic network of the nodes so as to identify the glycopeptides.

2. The method according to claim 1, further comprising:
   for each node of the graph, setting the node as a hub node and all other nodes as arm nodes, and connecting the hub node with the arm nodes to form the pairs of the nodes.

3. The method according to claim 1, wherein the step of generating the graph theoretic network of the nodes comprises:
   retaining a plurality of the pairs of the nodes, wherein the difference in the mass between each of the retained plurality of pairs of the nodes is equal to a mass of a glycan attachment within a list of known glycan attachments, and/or the difference in the retention time between each of the retained plurality of pairs of the nodes is less than a retention time threshold.

4. The method according to claim 3, wherein the list of known glycan attachments comprises one or more of: N-acetylhexosamines, sialic acids, Hexoses, and Deoxyhexoses.

5. The method according to claim 4, wherein the N-acetylhexosamines include N-acetylglucosamine and N-acetylgalactosamine, the sialic acids include N-acetylneuraminic acid and N-glycolylneuraminic acid, the Hexoses include Mannose and Galactose; and the Deoxyhexoses include Fucose.

6. The method according to claim 3, wherein the retention time threshold is 50 seconds.

7. The method according to claim 3, wherein the retention time threshold is variable based on a separation performance of a liquid chromatography device that is used prior to obtaining the MS1 precursors of the sample.

8. The method according to claim 3, further comprising:
   extracting the retained plurality of the pairs of the nodes as one or more subgraphs of nodes, each subgraph of nodes being isolated to other subgraphs of nodes,
   wherein each subgraph of nodes represents a group of glycopeptides sharing a same peptide backbone with different glycan attachments, and
   wherein the graph theoretic network of the nodes comprises the one or more subgraphs of nodes.

9. The method according to claim 8, wherein the step of predicting the compositions of the glycopeptides comprises:
   identifying a sequence of the peptide backbone in each subgraph of nodes;
   calculating a mass of the peptide backbone based on the identified sequence; and
   predicting the compositions of the glycopeptides by identifying the glycan attachments of the glycopeptides based on the difference in the mass and/or retention time between each pair of the nodes in the subgraph.

10. The method according to claim 8, further comprising:
    for each subgraph of nodes, selecting a reference node;
    identifying a sequence of the reference node of the subgraph; and
    predicting compositions of the rest of the nodes in the subgraph based on the difference in the mass and/or retention time between each pair of the nodes in the subgraph and the sequence of the reference node.

11. The method according to claim 10, wherein the step of predicting compositions of the rest of the nodes in the subgraph comprises:
    predicting relative compositions of the rest of the nodes in the subgraph based on the difference in the mass and/or retention time between each pair of the nodes in the subgraph; and
    predicting absolute compositions of the rest of the nodes in the subgraph by incorporating the relative compositions of the rest of the nodes with the sequence of the reference node.

12. The method according to claim 1, further comprising:
    providing the predicted compositions of the glycopeptides to a database including compositions of known glycans and peptides; and
    conducting one or more searches to identify glycopeptides in the sample based on the database.

13. A computer readable medium comprising instructions which, when executed by a processor, make the processor perform a method for identifying glycopeptides in a sample according to claim 1.

14. An apparatus for identifying glycopeptides in a sample, the apparatus comprising:
    at least one input module;
    at least one output module;
    at least one processor; and
    at least one memory including computer program code;

wherein the input module is configured to receive data from a liquid chromatography/mass-spectrometry (LC-MS) system, the data including mass spectrum data, wherein the output module is configured to output a result of the identified glycopeptides, and wherein the at least one memory and the computer program code are configured to, with the at least one processor, cause the apparatus at least to:

convert a mass spectrum of MS1 precursors of the sample into a plurality of nodes in a graph, each node corresponding to one mass and one retention time of a glycopeptide to be identified in the sample;

calculate differences in the mass and/or retention time between all combinations of pairs of the nodes;

generate a graph theoretic network of the nodes; and predict compositions of the glycopeptides in the sample based on the graph theoretic network of the nodes so as to identify the glycopeptides.

15. The apparatus according to claim 14, wherein the apparatus is further caused to:

for each node of the graph, set the node as a hub node and all other nodes as arm nodes, and connect the hub node with the arm nodes to form the pairs of the nodes.

16. The apparatus according to claim 14, wherein at the step of generating the graph theoretic network of the nodes, the apparatus is caused to:

retain a plurality of the pairs of the nodes, wherein the difference in the mass between each of the retained plurality of pairs of the nodes is equal to a mass of a glycan attachment within a list of known glycan attachments, and/or the difference in the retention time between each of the retained plurality of pairs of the nodes is less than a retention time threshold.

17. The apparatus according to claim 16, wherein the list of known glycan attachments comprises one or more of: N-acetylhexosamines, sialic acids, Hexoses, and Deoxyhexoses.

18. The apparatus according to claim 17, wherein the N-acetylhexosamines include N-acetylglucosamine and N-acetylgalactosamine, the sialic acids include N-acetylneuraminic acid and N-glycolylneuraminic acid, the Hexoses include Mannose and Galactose; and the Deoxyhexoses include Fucose.

19. The apparatus according to claim 16, wherein the retention time threshold is 50 seconds.

20. The apparatus according to claim 16, wherein the retention time threshold is variable based on a separation performance of a liquid chromatography device that is used prior to obtaining the MS1 precursors of the sample.

21. The apparatus according to claim 16, wherein the apparatus is further caused to:

extract the retained plurality of the pairs of the nodes as one or more subgraphs of nodes, each subgraph of nodes being isolated to other subgraphs of nodes, wherein each subgraph of nodes represents a group of glycopeptides sharing a same peptide backbone with different glycan attachments, and wherein the graph theoretic network of the nodes comprises the one or more subgraphs of nodes.

22. The apparatus according to claim 21, wherein at the step of predicting the compositions of the glycopeptides, the apparatus is caused to:

identify a sequence of the peptide backbone in each subgraph of nodes;

calculate a mass of the peptide backbone based on the identified sequence; and predict the compositions of the glycopeptides by identifying the glycan attachments of the glycopeptides based on the difference in the mass and/or retention time between each pair of the nodes in the subgraph.

23. The apparatus according to claim 21, wherein the apparatus is further caused to:

for each subgraph of nodes, select a reference node;

identify a sequence of the reference node of the subgraph; and predict compositions of the rest of the nodes in the subgraph based on the difference in the mass and/or retention time between each pair of the nodes in the subgraph and the sequence of the reference node.

24. The apparatus according to claim 19, wherein at the step of predicting compositions of the rest of the nodes in the subgraph, the apparatus is caused to:

predict relative compositions of the rest of the nodes in the subgraph based on the difference in the mass and/or retention time between each pair of the nodes in the subgraph; and predict absolute compositions of the rest of the nodes in the subgraph by incorporating the relative compositions of the rest of the nodes with the sequence of the reference node.

25. The apparatus according to claim 14, wherein the apparatus is further caused to:

provide the predicted compositions of the glycopeptides to a database including compositions of known glycans and peptides; and conduct one or more searches to identify glycopeptides in the sample based on the database.

* * * * *

UNITED STATES PATENT AND TRADEMARK OFFICE
CERTIFICATE OF CORRECTION

PATENT NO. : 11,378,558 B2
APPLICATION NO. : 16/772828
DATED : July 5, 2022
INVENTOR(S) : Sern Farh Matthew Choo et al.

It is certified that error appears in the above-identified patent and that said Letters Patent is hereby corrected as shown below:

In the Claims

At Column 17, Line 2, "chromatographymass-spectrometry" should be -- chromatography-mass spectrometry --.

Signed and Sealed this
Fourteenth Day of March, 2023

Katherine Kelly Vidal
*Director of the United States Patent and Trademark Office*